Oct. 18, 1960          E. SCHWARZ          2,956,620
TIRE BEAD BREAKING DEVICE WITH ADJUSTABLE RIM ANCHORING MEANS
Filed April 16, 1957          4 Sheets-Sheet 1
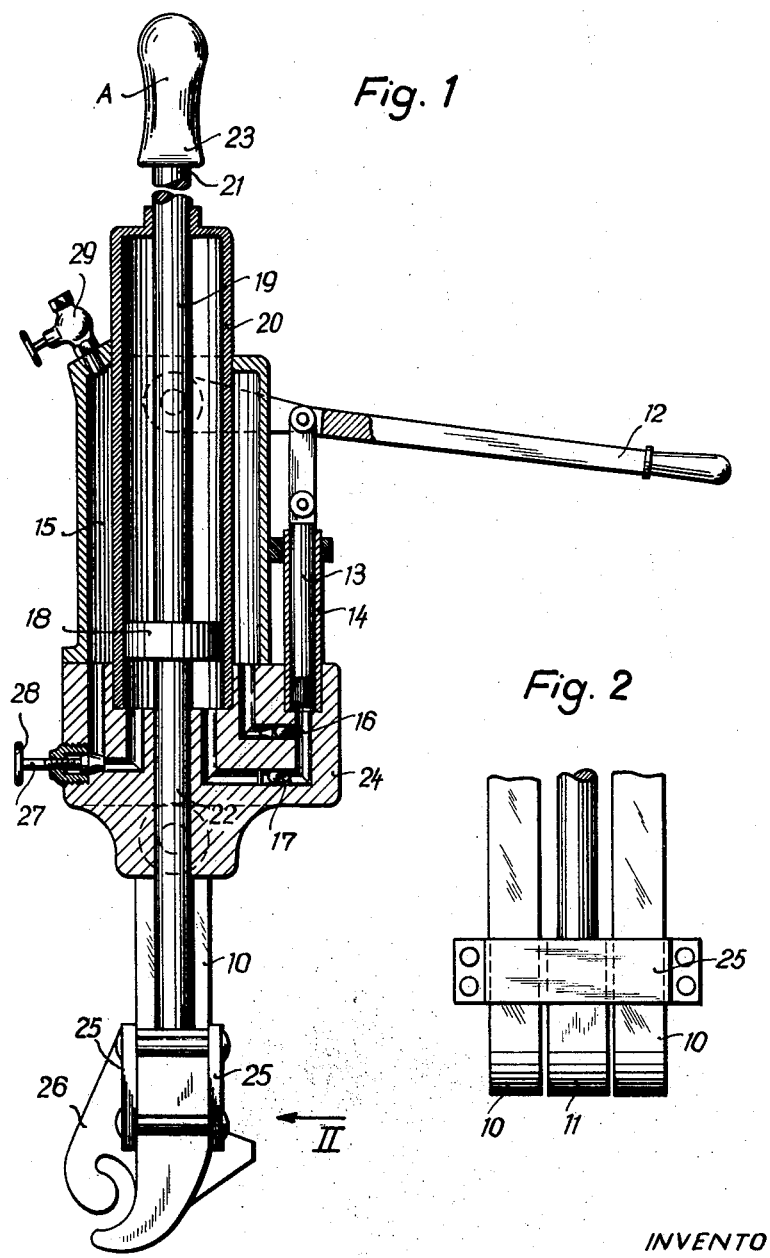
INVENTOR
Erwin SCHWARZ
By Ernest G. Montague
ATTORNEY Oct. 18, 1960     E. SCHWARZ     2,956,620
TIRE BEAD BREAKING DEVICE WITH ADJUSTABLE RIM ANCHORING MEANS
Filed April 16, 1957     4 Sheets-Sheet 2
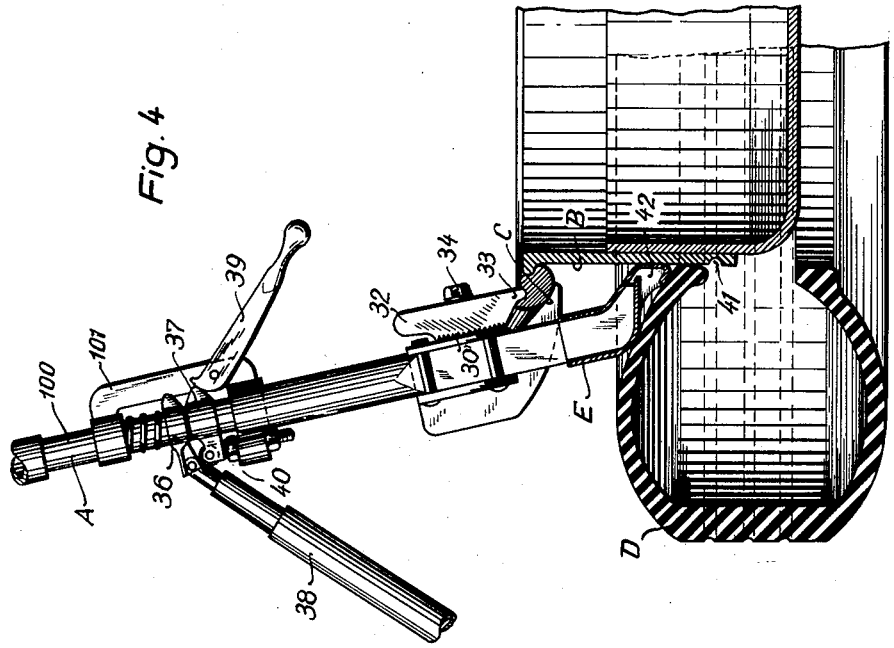
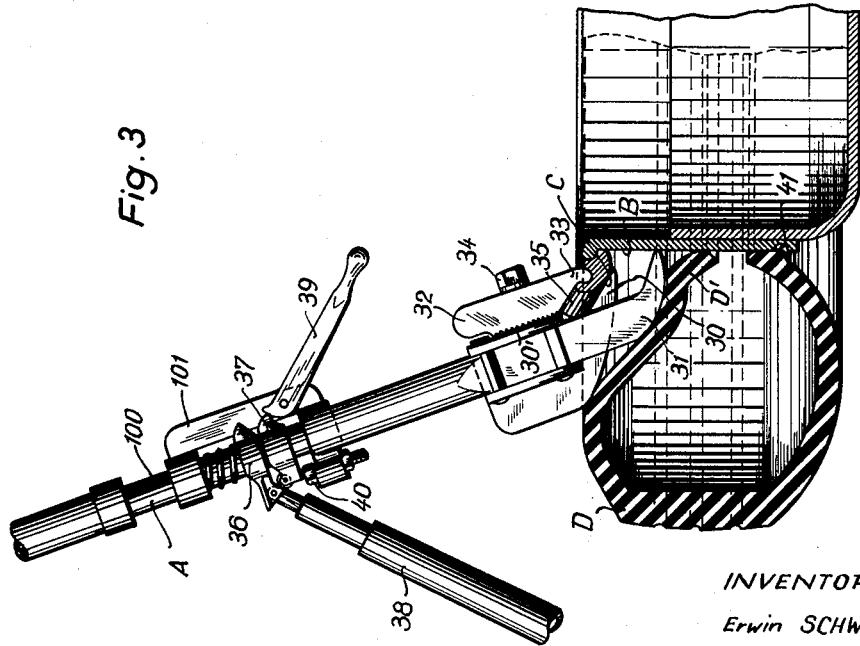
INVENTOR
Erwin SCHWARZ
By Ernest G. Montague
ATTORNEY Oct. 18, 1960　　　　E. SCHWARZ　　　　2,956,620
TIRE BEAD BREAKING DEVICE WITH ADJUSTABLE RIM ANCHORING MEANS
Filed April 16, 1957　　　　　　　　　　　　4 Sheets-Sheet 3

INVENTOR
Erwin SCHWARZ
By Ernest G. Montague
ATTORNEY

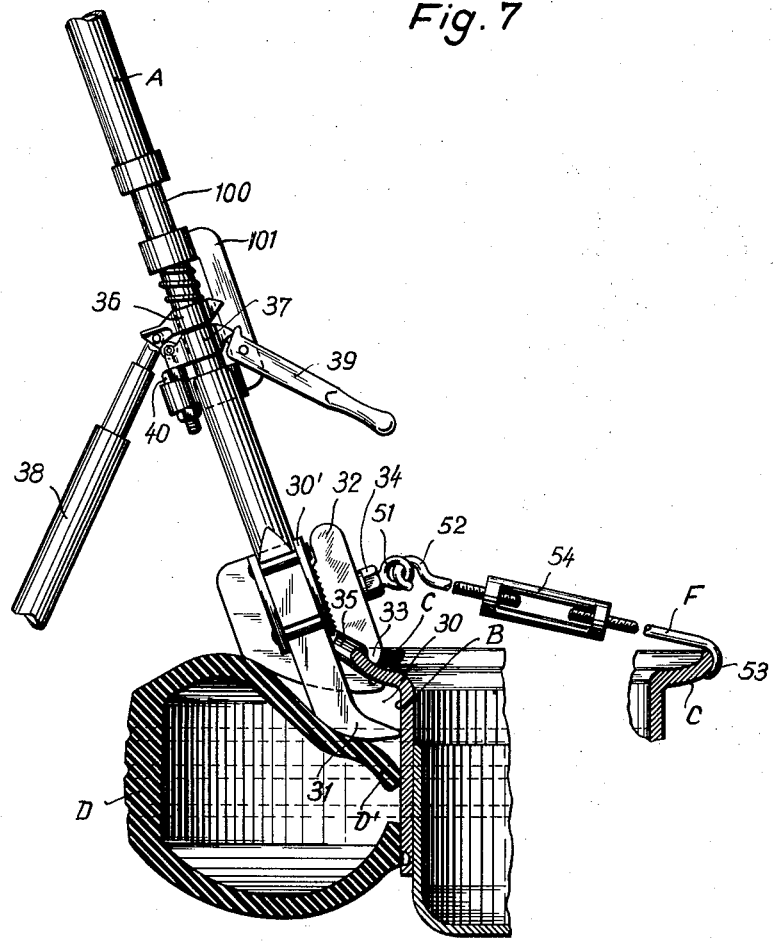

United States Patent Office 2,956,620
Patented Oct. 18, 1960

2,956,620

TIRE BEAD BREAKING DEVICE WITH ADJUSTABLE RIM ANCHORING MEANS

Erwin Schwarz, 38 Oststrasse, Wuppertal-Wichlinghausen, Germany

Filed Apr. 16, 1957, Ser. No. 653,117

Claims priority, application Germany June 5, 1956

3 Claims. (Cl. 157—1.17)

The present invention relates to a tire bead breaking device with adjustable rim anchoring means, the jaw member of which comprises a hook-shaped claw part, which engages the flange of the wheel rim, while at least one pressure foot is movable in longitudinal direction of the device by its drive relative to the first jaw member, a toe end of the pressure foot being co-ordinated to the rim engaging jaw member.

It is known that tires particularly of trucks sit as a rule unusually rigid on the divided wheel rim, so that it is not removable therefrom without an auxiliary tool. Tire bead breaking devices have been developed, therefore, which are designed to simplify the removal of the tire from the rim. Among such tools are the so-called tire removal claws. The mouth of these claws comprises two jaw members and a pressure foot disposed therebetween, the edges of which coincide with each other in the closed position, so that it is possible to engage the two jaw members with the rim and to disengage the tire from the rim of the pressure foot.

It is one object of the present invention to provide a tire bead breaking device which may be operated simply, easily and comfortably and the main elements of which comprise a hydraulic drive with double guidance of the piston rod on the one hand, an adjustable toe on the other hand, and furthermore a setting shoe.

The hydraulic drive has the advantage over known drives, that the claw, supported preferably by the wheel rim, is rigidly connected with a piston rod, which has two bearings, namely one disposed in the lower portion of the housing and another in the upper portion of the working cylinder, wherein the piston reciprocates, so that the piston rod is equally loaded and one-sided forces are eliminated.

The adjustability of the toe proved to be advantageous, since the curved slot receiving the wheel rim may be changed for all rim sizes by simple turning or moving of the toe.

By using the setting shoe of the present invention which is substantially of Z-shape and pocket-like, the hook shape of the movable pressure foot, the operative portion of which is disposed crosswise to the longitudinal axis of the device, is designed in such manner due to the Z-shape of the shoe, that the movable pressure foot is extended in the direction of the longitudinal axis of the device, however laterally offset parallel to said axis. This arrangement brings about the advantage that the stroke of the device is extended and a proper removal of the tire from the rim is assured.

With this and other objects in view, which will become apparent in the following detailed description, the present invention will be clearly understood in connection with the accompanying drawings, in which:

Figure 1 is an axial section of a tire bead breaking device with hydraulic drive;

Fig. 2 is a front elevation of the jaw members and of the pressure foot;

Fig. 3 is an elevation of another embodiment of the adjustable jaw with rim, tire bead breaking device, and in particular in the starting position of the removal process;

Fig. 4 is a view similar to that shown in Fig. 3, however, showing the removal process at an advanced stage and with a setting shoe;

Fig. 7 is an elevational view of still a further embodiment of the tire bead breaking device with a tightening lock.

Figure 5:
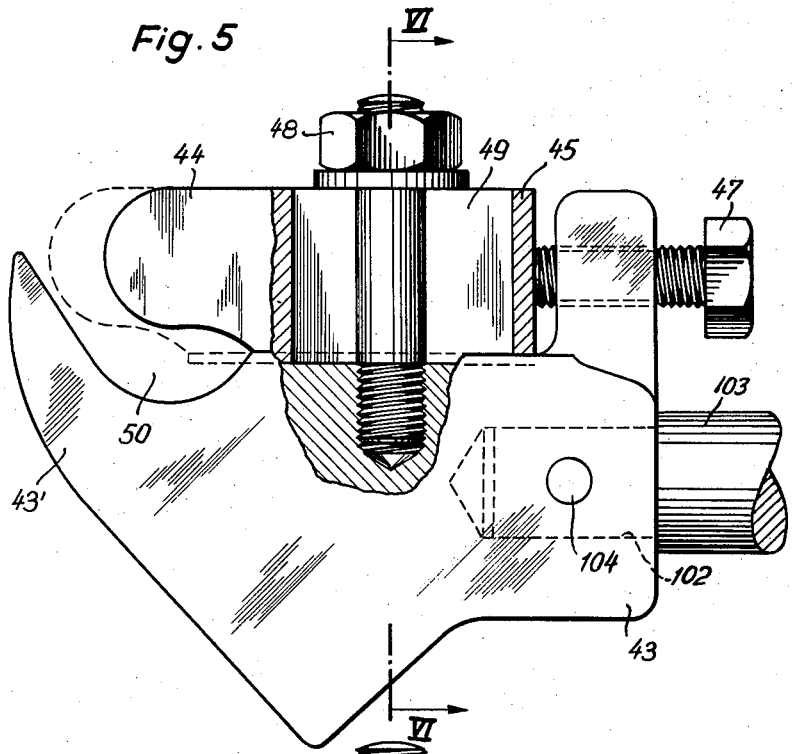
Fig. 5 is a fragmentary view of the head of still another embodiment of the tire bead breaking device.

Referring now to the drawings, and in particular to Figs. 1 to 6, the tire bead breaking device A engages the wheel comprising the rim bed B and the rim edge C, which carry the tire D.

The structure of the tire bead breaking device A, as disclosed in Figs. 1 and 2, will now be described in detail simultaneously with its working performance. The tire bead breaking device A is set on a wheel in such manner that the tire removing members, the pressure foot 10 and the claw part 11, are disposed between the flange of the wheel rim C and the tire D.

A pump lever 12 pivotally mounted on the housing of the device operates a piston 13 reciprocating in a cylinder 14, whereby upon lifting the lever 12 oil is drawn into the cylinder 14 from an oil chamber 15 arranged in said housing through a relief-valve 16 disposed in a conduit connecting the oil chamber 15 with the cylinder 14. Upon lowering of the lever 12 a relief-valve 17 is opened, the relief-valve 17 being disposed in another conduit connecting the cylinder 14 with a cylinder 20 arranged in the housing, and a working piston 18 mounted on the piston rod 19, 21, 22 and reciprocating in the cylinder 20, is moved upwardly.

The piston 18 is arranged at about the center of the piston rod 19, 21, 22, the upper end 21 of which is guided in the upper end of the cylinder 20 and the extension of which is formed as a handle 23. The lower portion 22 of the piston rod 19 is guided in the casing 24 and carries at its lower end a claw part 11 which is rigidly secured to the piston rod 19, 21, 22 and guided between two adjacently disposed pressure feet 10 which are interconnected by a pair of spaced metal straps 25.

Upon exerting a pumping action by means of the lever 12, the piston 18 moves in upward direction and the casing 24 in downward direction, respectively, while the claw part 11 in combination with a toe 26 formed complementary to the wheel rim engages the latter. The outer pressure feet 10, which are secured to the casing 24, move downwardly with the latter and push, thereby, the tire D from the wheel rim B, C.

In order to permit the return of the piston 18 and the casing 24, respectively, into the original position, upon removal of the tire D from the wheel rim B, C, a blow-off valve 27 operable by a turning knob 28 is opened, so that the oil may be fed from the working cylinder 20 back into the oil chamber 15.

The air escape and air feeding, respectively, from and to the oil chamber 15 is made possible by a valve 29 which is disposed at the upper end of the oil chamber 15 and which valve 29 is self-controlled by the pressure in the oil chamber 15 and the atmospheric pressure, respectively.

Referring now to Figs. 3 and 7, another embodiment of the present invention is disclosed, wherein the claw movement is performed by a mechanical drive.

The device A has a shaft 100 movably mounted in a housing, a claw part 30 connected to the shaft and pressure feet 31 connected to the housing. Claw part 30 supports itself upon the flange C of the rim, while the two laterally arranged pressure feet 31, disposed at the right and at the left of the rigid median claw part 30, are movable relative to the latter in longitudinal direction of the device A and remove the tire D from the wheel rim B, C.

A toe 32, 33 is also arranged to co-operate with the rigid median claw part 30 and is equipped with two selectively used end portions. This double ended toe 32, 33 is secured to the median claw part 30 by means of a screw bolt 34 and is adjustable relative to the median claw part 30. In order to achieve this end, the connecting part 30' of the median claw part 30, as well as the engaging face of the toe 32, 33 carry a plurality of teeth which retain the toe 32, 33 in its selected position relative to the median claw part 30. By arranging a longitudinal slot (not shown) in the toe 32, 33 through which the screw bolt 34 projects, the toe may be adjusted in longitudinal direction of the device A relative to the median claw part 30. The toe 32, 33 may be used, selectively, in the position shown in Fig. 3, in which the end 33 of the toe co-operates with the claw part 30, or it is possible to use the toe 32, 33 in a position 180° away from the former position.

The movement of the movable pressure feet 31 relative to the rigid claw part 30 which supports itself on the edge C of the rim is brought about by means of a drive in accordance with a canting ring feeding mechanism. One canting ring 36 of this feeding mechanism serves in known manner the advancement of the movable claw parts, while another canting ring 37 secures the position just reached. The canting ring 36 is equipped with an operating lever 38 pivoted thereto and furthermore a release lever 39 is pivoted to the feeding mechanism consisting of the yoke 101, which is axially movable along the shaft 100. The lever 39 is used to lift the canting ring 37 out of its canting position in order to permit of fast adjustment of the device A. On the side opposite the release lever 39 is provided an adjustable abutment member 40 for the canting ring 37.

The tire bead breaking device A is operated in such manner that one of the toe ends, for instance the end 33, engages the flange C of the rim and the ends of the claw part 30 and pressure feet 31, which are now in coinciding position, are pressed into the slot between the flange C of the rim and the tire D. Then the feeding mechanism is operated, whereupon the tire D is removed frome the flange C of the rim, as shown in Fig. 3. The removing device A is moved step by step around the tire D, whereupon spacing blocks (not shown) are inserted between the flange C of the rim and the tire D, in order to secure the attained removal position of the latter.

If the tire D is removed from the flange C of the rim all around to an extent that the tire portion D' engaged by the pressure feet 31 reaches the range of the known annular groove 41 of the rim bed, a setting shoe E is mounted on each of the movable pressure feet 31, as shown in Fig. 4. This setting shoe E is cranked substantially in Z-shape. The one crank-arm forms a pocket-like sleeve for the pressure feet 31, while the other crank-arm 42 disposed parallel to the former extends the pressure feet 31, however, set off relative to the longitudinal axis of the device A in the direction towards the rim. Upon mounting the shoe E, the device A is further operated as before, whereby the cranked end 42 of the shoe E removes completely the tire D from the rim, and, thereby, passes the tire portion D' beyond the annular groove 41.

The Z-shaped shoe comprises a pocket-shaped body made of sheet-metal or the like, which body complements the pressure feet, so that the body may slide onto the pressure foot. The shoe is equipped with an extension, whereby the point is engaged by the pressure foot is close to the rim. The shoe is thus of Z-shape in order to permit of shifting of the pressure point towards the wheel rim after mounting of the shoe. The shape of the shoe is clearly shown in Fig. 4. The front face of the shoe is of rectangular shape corresponding with the rectangular configuration of the pressure foot.

Figure 6:
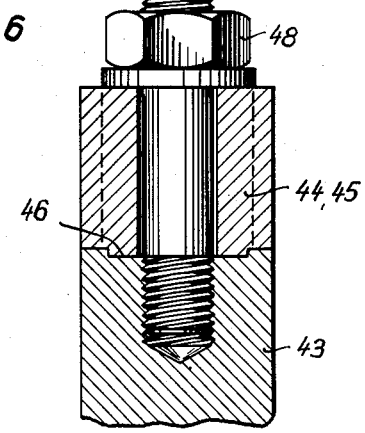
Fig. 6 is a section through the head along the lines 6—6 of Fig. 5.

Referring now to Figs. 5 and 6, still another embodiment of a rim-engaging claw is disclosed. This claw is provided with a socket 102 for the reception of a shaft 103, secured therein by a pin, as at 104. The shaft 103 is the equivalent of the shaft 100 or the piston rod 22 in the previously described embodiments. The claw comprises two main parts, namely, the rigid immovable claw part 43, 43' and the claw part 44, 45 movable relative to the former. The claw part 44, 45 is designed as a slide, which moves along a step-like set-off bed 46. The slide 44, 45 is movable in the longitudinal direction of the device by means of a pressure set-screw 47, which abuts the rear end 45 of the claw, while a clamping screw 48 retains the claw 44, 45 in any adjusted position. The clamping screw 48 projects through a longitudinal slot 49 of the claw 44, 45, which slot 49 is disposed in the longitudinal axis of the device.

By adjusting the claw 44, 45 relative to the immovable slaw part 43, 43', the front nose 44 of the claw forms with the claw part 43' a greater or smaller slot-opening 50 which is accommodated to the wheel rim to be worked on, so that an adjustment of the claw 44, 45 into an endless number of positions relative to the claw part 43, 43' is made possible.

In the device A, shown in Fig. 7, an auxiliary device F in the form of a tightening lock is provided, which serves the purpose to support the device A effectively during the driving of the edges of the clamp parts 30, 31 between the edge C of the rim and the tire D, and to simplify this driving step by providing a particularly solid engagement with the tightening lock.

In order to achieve this end, the screw bolt 34 of the device A is equipped with a closed eye 51 which receives one hook-shaped open end 52 of the tightening lock F. The oppositely disposed, likewise hook-shaped end 53 of the tightening lock engages the side opposite the device A of the flange C of the rim. The two hook-shaped ends 52, 53 of the tightening lock F may be moved closer or more apart, respectively, by means of the common turn buckle 54.

The tightening lock F is inserted into the eye 51 upon engaging the device A on one side of the flange C of the rim and after applying the lock F to the other side of the flange C of the rim, the lock is tightened by turning the turn buckle 54, until the device A has a solid grip on the rim B, C. After the driving of the edges between the flange C of the rim and the tire D, the tightening lock F may be removed, so that the removal of the tire D is not disturbed.

The shown and described embodiments are merely examples of the present invention and the latter is not limited thereto, rather other embodiments and applications are possible within the scope of the present invention, particularly in relation to the design of the hydraulic and mechanical drive of the tire bead breaking device. It is also possible to vary the structure of the toe 32, 33, as well as of the setting shoe F. The adjustment of the toe by means different from those shown in the examples is likewise possible. Another toe construction wherein the movable parts are guided in the immovable claw part cannot be excluded. Thus, the scope of the present invention is determined by the objects and the claims.

I claim:

1. A tire bead breaking device comprising a longitudinal casing and at least two hook-shaped claw parts, one of said claw parts being immovable relative to said casing, at least one other of said claw parts being movable in longitudinal direction of said casing relative to said immovable claw part and adapted to support itself on a wheel rim, a rod axially movable in said casing and rigidly connected with said movable claw part, means to cause longitudinal movement of said rod together with said movable claw part relative to said casing, an adjustable toe connected with and co-ordinated to said movable claw part to form an open slot between said toe and said claw part receiving the flange of said rim, and said rod having at least two bearings axially spaced apart from each other for proper mounting of said rod, and means adjusting said toe relative to said movable claw part, means associated with said movable claw part retaining said toe in any one of its operative positions comprising a longitudinal slot in said toe receiving a screw bolt threaded in said movable claw part and an angulated tire pressing shoe of substantially Z-shape, one end of said tire pressing shoe being formed as a pocket sleeve and receiving said immovable claw part and the other end of said tire pressing shoe being disposed substantially parallel to and laterally set-off from the longitudinal axis of said device.

2. The device, as set forth in claim 1, wherein said toe is formed as a slide and said movable claw part having a guide receiving said toe for longitudinal movement of the latter, means for adjusting and for retaining said toe relative to said movable claw part, said guide comprising a set-off slide bed disposed parallel to the longitudinal direction of said device, so that a cross-movement of said toe is prevented.

3. A tire bead breaking device comprising a longitudinal casing and at least two hook-shaped claw parts, one of said claw parts being immovable relative to said casing, at least one other of said claw parts being movable in longitudinal direction of said casing relative to said immovable claw part and adapted to support itself on a wheel rim, a rod axially movable in said casing and rigidly connected with said movable claw part, means to cause longitudinal movement of said rod together with said movable claw part relative to said casing, an adjustable toe connected with and co-ordinated to said movable claw part to form an open slot between said toe and said claw part receiving the flange of said rim, and said rod having at least two bearings axially spaced apart from each other for proper mounting of said rod, and means adjusting said toe relative to said movable claw part, said toe having two diametrically opposed operating elements to be used selectively by turning said toe for 180°, said movable claw part and said toe having engaging toothed faces in order to retain said toe in any one of its operative positions, and said toe having a longitudinal slot receiving a screw bolt threaded in said movable claw part, and an angulated tire pressing shoe of substantially Z-shape, one end of said tire pressing shoe being formed as a pocket sleeve and receiving said immovable claw part and the other end of said tire pressing shoe being disposed substantially parallel to and laterally set-off from the longitudinal axis of said device.

References Cited in the file of this patent

UNITED STATES PATENTS

| | | |
|---|---|---|
| 521,265 | Haberthur | June 12, 1894 |
| 527,132 | Teel | Oct. 9, 1894 |
| 830,479 | Hunefeld et al. | Sept. 4, 1906 |
| 1,452,596 | De Fernelmont | Apr. 24, 1923 |
| 2,034,819 | Maulis | Mar. 24, 1936 |
| 2,262,429 | Lucker | Nov. 11, 1941 |
| 2,367,638 | McCulloch | Jan. 16, 1945 |
| 2,495,117 | McCollister | Jan. 17, 1950 |
| 2,679,896 | Branick | June 1, 1954 |
| 2,753,923 | Bowyer | July 10, 1956 |

FOREIGN PATENTS

| | | |
|---|---|---|
| 893,455 | Germany | Oct. 15, 1953 |